United States Patent
Guggenberger et al.

(10) Patent No.: US 10,994,960 B2
(45) Date of Patent: May 4, 2021

(54) METHOD FOR CYCLICALLY ADVANCING MATERIAL BLANKS IN A PACKAGING MACHINE

(71) Applicant: Multivac Sepp Haggenmüller SE & Co. KG, Wolfertschwenden (DE)

(72) Inventors: Tobias Guggenberger, Memmingen (DE); Peter Kovacs, Memmingen (DE); Robert Maier, Babenhausen (DE); Konrad Mößnang, Kempten (DE); Christian Lau, Heimenkirch (DE)

(73) Assignee: MULTIVAC SEPP HAGGENMUELLER SE & CO. KG, Wolfertschwenden (DE)

( * ) Notice: Subject to any disclaimer, the term of this patent is extended or adjusted under 35 U.S.C. 154(b) by 0 days.

(21) Appl. No.: 16/662,604

(22) Filed: Oct. 24, 2019

(65) Prior Publication Data

US 2020/0130975 A1 Apr. 30, 2020

(30) Foreign Application Priority Data

Oct. 26, 2018 (DE) ...................... 10 2018 218 385.6

(51) Int. Cl.
*B65H 20/16* (2006.01)
*B65H 5/14* (2006.01)
(Continued)

(52) U.S. Cl.
CPC ............. *B65H 20/16* (2013.01); *B65B 5/068* (2013.01); *B65B 41/04* (2013.01); *B65B 43/44* (2013.01);
(Continued)

(58) Field of Classification Search
CPC . B65H 5/08; B65H 5/085; B65H 5/12; B65H 5/14
See application file for complete search history.

(56) References Cited

U.S. PATENT DOCUMENTS 4,470,593 A * 9/1984 Halff ...................... B65H 5/085
271/277
4,674,739 A * 6/1987 Smith .................. B65H 29/045
271/268
(Continued)

FOREIGN PATENT DOCUMENTS

DE 10326727 B3 8/2004
DE 102006006523 A1 8/2007
(Continued)

OTHER PUBLICATIONS

European Communication dated Mar. 19, 2021 (with English Machine Translation), Application No. 19 203 460.1-1016, Applicant MULTIVAC Sepp Haggenmueller SE & Co. KG, 14 Pages.

*Primary Examiner* — Jeremy R Severson
(74) *Attorney, Agent, or Firm* — Brooks Kushman P.C.

(57) ABSTRACT

A method for operating a packaging machine including one or more of the method steps advancing a transport chain along a chain deflection pulley, wherein chain clips are arranged on the transport chain and moved during the advancing motion of the transport chain along a run-on contour, to open at least one of the chain clips; introducing a flat material blank into the at least one open chain clip using a feed device or by entraining the flat material blank using a connection to a second material blank preceding the flat material blank, wherein the material blank enters the open chain clip during an advancing motion of the transport chain; closing the chain clip by leaving the run-on contour, to grip and secure the material blank in the chain clip; and transporting the material blank to a work station using the transport chain.

19 Claims, 2 Drawing Sheets

(51) Int. Cl.
  *B65H 9/10* (2006.01)
  *B65H 7/06* (2006.01)
  *B65H 3/04* (2006.01)
  *B65G 17/32* (2006.01)
  *B65G 43/08* (2006.01)
  *B65B 5/06* (2006.01)
  *B65B 41/04* (2006.01)
  *B65B 43/44* (2006.01)
  *B65H 5/08* (2006.01)

(52) U.S. Cl.
  CPC ........... *B65G 17/326* (2013.01); *B65G 43/08* (2013.01); *B65H 3/042* (2013.01); *B65H 5/085* (2013.01); *B65H 5/14* (2013.01); *B65H 7/06* (2013.01); *B65H 9/10* (2013.01); *B65H 2301/44338* (2013.01); *B65H 2701/176* (2013.01); *B65H 2801/81* (2013.01)

(56) References Cited

U.S. PATENT DOCUMENTS

| | | | | |
|---|---|---|---|---|
| 5,320,341 | A * | 6/1994 | Pease | B65H 5/085 271/202 |
| 6,478,297 | B1 * | 11/2002 | Messerschmid | B65H 5/085 198/803.1 |
| 2002/0129893 | A1 * | 9/2002 | Winter | B65H 5/085 156/283 |

FOREIGN PATENT DOCUMENTS

| | | |
|---|---|---|
| EP | 126878 A1 | 12/1984 |
| EP | 2 653 420 A2 | 10/2013 |

* cited by examiner

METHOD FOR CYCLICALLY ADVANCING MATERIAL BLANKS IN A PACKAGING MACHINE

CROSS-REFERENCE TO RELATED APPLICATIONS

This Application claims priority to German Patent Application No. 10 2018 218 385.6 filed on Oct. 26, 2018 to Tobias Guggenberger, Peter Kovacs, Robert Maier, Konrad Mößnang and Christian Lau, currently pending, the entire disclosure of which is incorporated herein by reference.

FIELD OF THE INVENTION

The present invention relates to a method for operating a packaging machine and one such.

BACKGROUND OF THE INVENTION

In addition to work stations for filling and subsequently sealing packagings, packaging machines, in particular for food products, typically also comprise work stations for forming the packaging itself from a primary material supplied. For example, packaging trays, into which a food product is subsequently inserted, are formed by way of thermo-forming from a suitable base film and the packaging tray is sealed airtight with a top film. As the use of alternative packaging materials becomes increasingly relevant to raise environmental sustainability and recyclability, packaging machines must also be adapted for use with these materials. When using, for example, coated cardboard as the starting material for flat packaging bases, it is usually supplied as a stack or series of flat material blanks and must be supplied to the packaging machine by a suitable material supply.

SUMMARY OF THE INVENTION

The object of the present invention is to provide a method for operating a packaging machine which ensures efficient supply of packaging material in the form of flat material blanks, in particular with regard to the highest possible number of cycles.

One embodiment of a method according to the invention for operating a packaging machine comprises the following method steps: advancing a transport chain along a chain deflection pulley, where chain clips are arranged on the transport chain and moved during the advancing motion of the transport chain along a run-on contour, so that at least one of the chain clips is opened; introducing a flat material blank into the at least one open chain clip by way of a feed device or by entraining the flat material blank by way of a connection to a second material blank preceding the flat material blank, where the material blank enters the open chain clip during an advancing motion of the transport chain; closing the chain clip by leaving the run-on contour, so that the material blank is secured in the chain clip; and transporting the material blank to a work station by way of the transport chain.

The method steps are suited to be executed in the order presently shown.

"Transport chain" within the meaning of the invention is generally to be understood as a continuous transport device and can also comprise, in one embodiment, a transport belt.

The method makes it possible to line up the material blanks in the transport chain at a well-defined distance from each other or even without any spacing, quasi continuously. Due to the advancing motion, the position change of the chain clips may occur along the run-on contour, whereby the chain clips may change from a closed to an open state, and back again. It makes sense to use the advancing motion that takes place anyway for moving a material blank into the work station and out again. The cycle time is then not extended and the maximum possible cycle rates can be obtained.

Advancing the transport chain typically occurs in an intermittent manner. Since the manufacturing process in the work station usually takes a certain amount of time, the transport chain is likewise at a standstill during this time. Accordingly, pushing the material blank in is effected synchronized thereto during an advancing phase. It is then not necessary to adapt the motion of the transport chain, but the latter is the default to which the push-in motion is synchronized.

Once the material blank has been introduced into the open chain clip, the material blank in a preferred variant is temporarily moved by way of the feed device in a manner synchronized in speed to the advancing motion of the transport chain. This advantageously occurs when the desired position with respect to the chain clip has already been reached. This position is then maintained and the chain clip can close by leaving the run-on contour, thereby securing the material blank. Defined distances between the material blanks can thus be maintained and no relative motion between the transport chain and material blank arises, so that the latter is not compressed or stretched.

Ideally, the introduction of the material blank occurs at a higher speed than the speed of the transport chain. The distance to be covered can then be travelled without the transport chain or the cycle speed needing to be slowed down.

In one embodiment, introducing the flat material blank into the at least one open chain clip comprises a push-in and/or a placing process. Various systems can then be used as a feed device, for example an advancing device or a suction gripper. Chain clips with various opening mechanisms can also be used.

In an advantageous embodiment, successive material blanks are supplied to the transport chain at a well-defined distance from one another. The dimensions and work processes of the work station can then be fully taken into account and length tolerances of the material blanks can be compensated.

The position of the material blank, in particular the starting position before being introduced into the chain clip, may be preferably detected by way of one or more sensors. For example, an existing control device can ensure correct positioning of the material blanks by use of actuators in response to the sensor data detected.

In a further variant, the material blank may be aligned by way of a guide element and/or a pusher during the introduction into the chain clip and/or during the motion synchronous to the transport chain. This ensures correct positioning within the chain clip.

A packaging machine according to the invention comprises several work stations, for example a sealing station and a cutting station, a transport chain for transporting a flat material blank to the work stations and a chain deflection pulley on which the transport chain is mounted, where the transport chain comprises chain clips, each having an upper and a lower part and the upper part and/or the lower part being pivotable and/or slidable for opening and closing the chain clips. The material blank can be introduced into the open chain clips and secured in the closed chain clips, so that the material blank can be moved by ways of the transport chain along a direction of transport. The chain deflection pulley comprises a run-on contour which may be configured to reversibly open at least one chain clip which may be disposed along a section of the chain deflection pulley. The packaging machine further comprises a feed device configured to introduce the material blank into the open chain clip and a control device configured to control and synchronize the transport chain and the feed device such that the material blank enters the open chain clip, while the transport chain performs an advancing motion.

The material blank "entering" the chain clip presently refers to the moment in which the material blank with its front edge passes a rear contour of the chain clip in the direction of transport, i.e. the point in time from which the material blank may be disposed in part in the chain clip.

"Introducing" refers to the entire motion of the material blank caused by the feed device until the former has reached its intended final position within the chain clip. "Introducing" therefore refers to the motion of the material blank before and after "entering".

However, the material blank and the chain clip can continue to move synchronously after the introduction, so that, for example, the chain clip can leave the run-on contour and close, but they do not perform any motion relative to each other anymore.

The control unit may be preferably configured to cause intermittent advancing of the transport chain. This takes into account the course of the manufacturing process in the work station.

The control unit may be typically configured to control the feed device such that, once the material blank has been introduced into the open chain clip, the material blank may be temporarily moved by way of the feed device in a manner synchronized in speed to the advancing of the transport chain.

In a common variant, the run-on contour may be arranged such that the chain clip may be opened along a section in the region of an upper half of the chain deflection pulley, or that the run-on contour may be adjustable to adjust the section along the chain deflection pulley in which the chain clip may be opened.

The feed device preferably comprises an advancing device which may be configured to push a material blank into the open chain clip, and/or a suction gripper which may be configured to place the material blank into the open chain clip.

In a common variant, the packaging machine comprises one or more sensors which are configured to detect the position and orientation of the material blank. Other aspects and advantages of the present invention will be apparent from the following detailed description of the preferred embodiments and the accompanying drawing figures.

DESCRIPTION OF THE SEVERAL VIEWS OF THE DRAWINGS

In the following, an advantageous embodiment of the present invention will be explained in more detail making reference to a drawing, in which the individual figures show.

DETAILED DESCRIPTION OF THE INVENTION

Figure 1:
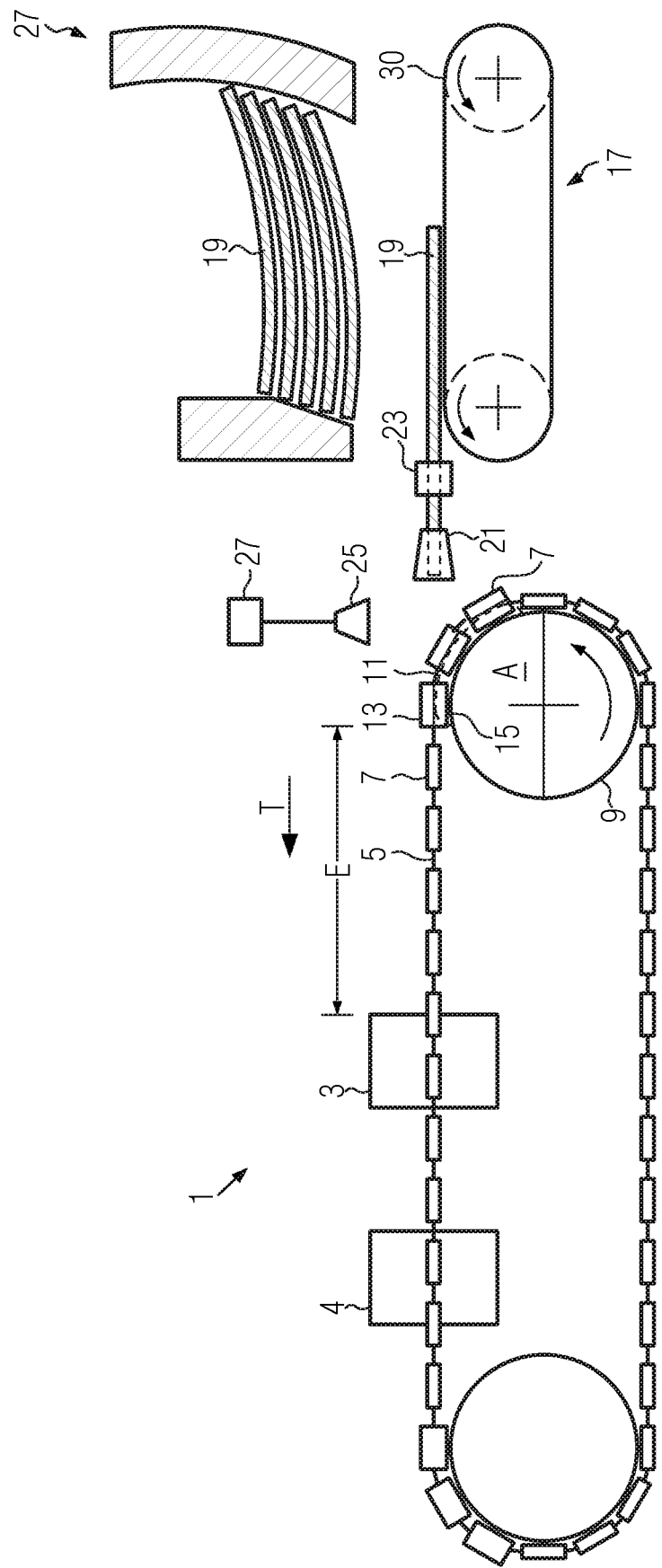
FIG. 1 is a schematic side view of one embodiment of a packaging machine having a material blank being pushed into an open chain clip in accordance with the teachings of the present disclosure.

The invention will now be described with reference to the drawing figures, in which like reference numerals refer to like parts throughout. For purposes of clarity in illustrating the characteristics of the present invention, proportional relationships of the elements have not necessarily been maintained in the drawing figures.

The following detailed description of the invention references specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The present invention is defined by the appended claims and the description is, therefore, not to be taken in a limiting sense and shall not limit the scope of equivalents to which such claims are entitled.

FIG. 1 shows a schematic view of a packaging machine 1 with two work stations 3, 4, for example, a sealing station 3 and a cutting station 4, as well as a transport chain 5 on which chain clips 7 are arranged for transporting primary material for packagings. Transport chain 5 is mounted on a chain deflection pulley 9 on which a run-on contour 11 is arranged, along which chain clips 7 run and are opened by run-on contour 11 during the advancing motion of transport chain 5. For example, an upper part 13 and/or a lower part 15 of the chain clip is there pivoted and/or slid away for opening chain clip 7. A feed device 17 introduces a flat material blank 19 in direction of transport T into open chain clips 7. A guide element 21 and a pusher 23 are present for aligning material blank 19. The position of material blank 19 is monitored by way of a sensor 25. A control unit 27 can actively align material blank 19 transverse to direction of transport T by controlling pusher 23. In addition, control unit 27 is configured to control transport chain 5 and feed device 17 such that material blank 19 enters an open chain clip 7 when transport chain 5 performs an advancing motion. In the variant presently shown, a respective material blank 19 is separated by a destacker 29 and pushed into open chain clips 7 by way of feed device 17 which presently comprises a conveyor-belt-like advancing device 30. For this purpose, run-on contour 11 is arranged in a region of an upper half A of chain deflection pulley 9. Disposed between chain deflection pulley 9 and sealing station 3 is an insertion region E in which products are placed onto or into material blanks 19 which are suitable as product supports or package bases. Material blanks 19 are secured in insertion region E in closed chain clips 7.

Figure 2:
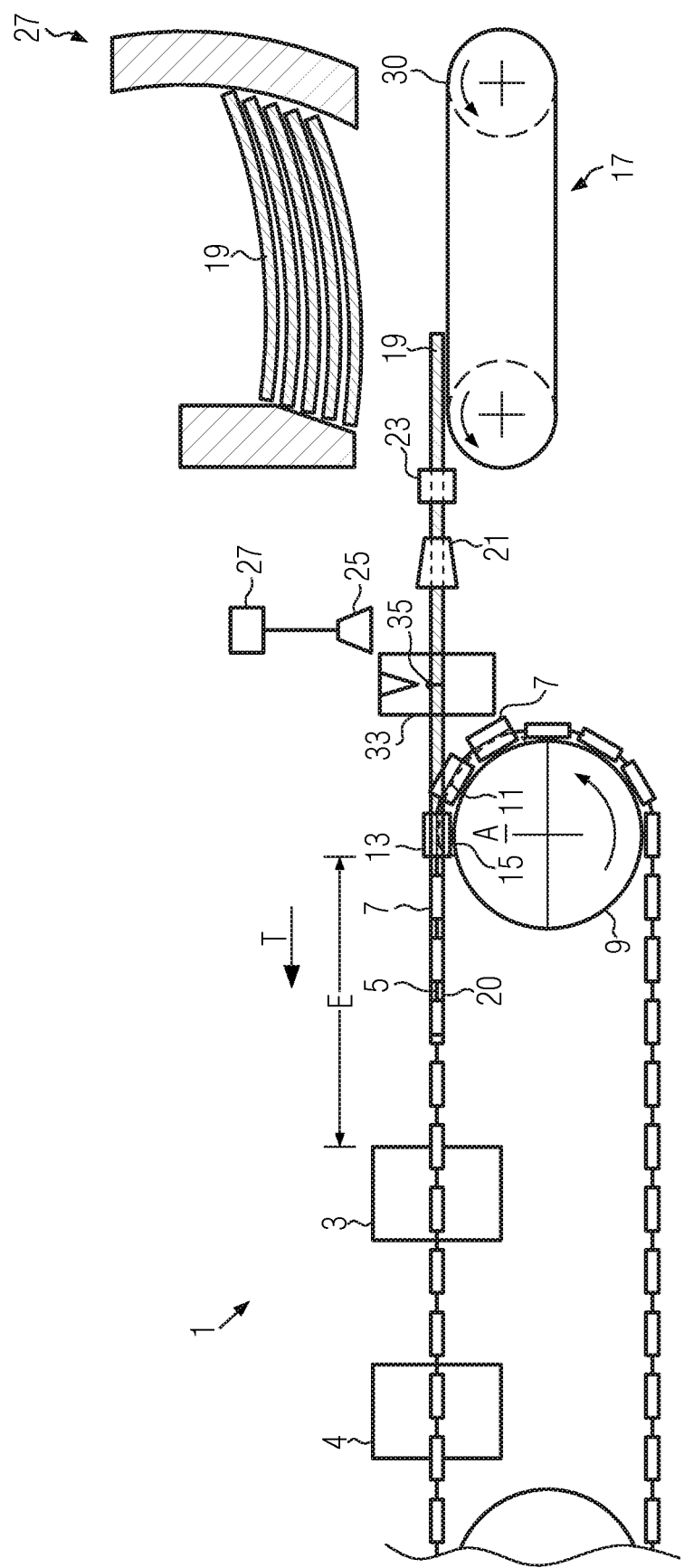
FIG. 2 is a schematic side view of another embodiment of a packaging machine in which a material blank is entrained by way of a connection to a preceding material blank in accordance with the teachings of the present disclosure.

FIG. 2 shows a schematic view of a further embodiment of a packaging machine 1 in which a second material blank 20 has already been introduced into chain clips 7 of transport chain 5 and secured by closed chain clips 7. A further material blank 19 has been pushed by feed device 17 to second material blank 20, so that both material blanks 19, 20 are in contact with each other. A tacking station 33 forms a connection 35 between material blanks 19, 20, where they contact each other at one edge, so that material blanks 19, 20 are firmly connected to one another. Connection 35 can comprise, for example, one or more glue dots or tacks. Advancing transport chain 5, and thereby second material blank 20 secured therein, also moves material blank 19 due to connection 35 and then guides it toward open chain clips 7. Material blank 19 is then also secured in closed chain clips 7. Further connections 35 can then be formed respectively between subsequent material blanks 19, resulting in a continuous flow of material blanks 19.

Starting out from the above-described embodiments of a method for operating a packaging machine 1, many variations thereof are possible. It is also conceivable, for example, to feed material blank 19 at an angle from below to open chain clip 7 which is positioned at a correspondingly angle on chain deflection pulley 9. A material blank 19 of sufficiently flexible material can then perform a still slightly curved motion along chain deflection pulley 9 before it transitions to the completely horizontal motion downstream of chain deflection pulley 9.

From the foregoing, it will be seen that this invention is one well adapted to attain all the ends and objects hereinabove set forth together with other advantages which are obvious and which are inherent to the structure. It will be understood that certain features and sub combinations are of utility and may be employed without reference to other features and sub combinations. This is contemplated by and is within the scope of the claims. Since many possible embodiments of the invention may be made without departing from the scope thereof, it is also to be understood that all matters herein set forth or shown in the accompanying drawings are to be interpreted as illustrative and not limiting.

The constructions and methods described above and illustrated in the drawings are presented by way of example only and are not intended to limit the concepts and principles of the present invention. Thus, there has been shown and described several embodiments of a novel invention.

As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required". Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A method for operating a packaging machine, the method comprising:
    advancing a transport chain along a chain deflection pulley in an advancing motion, where a plurality of chain clips are disposed on said transport chain and moved during the advancing motion of said transport chain;
    opening at least one of said chain clips by advancing said at least one of said chain clips along a run-on contour;
    introducing a flat material blank into said at least one open chain clip using one of a feed device or a connection to a second material blank preceding said flat material blank to entrain said flat material blank, wherein said material blank enters said at least one open chain clip during an advancing motion of said transport chain;
    closing said at least one of said chain clips as it leaves said run-on contour to secure said material blank in at least one of said chain clips; and
    transporting said material blank to a work station using said transport chain;
    wherein said advancing motion of said transport chain takes place intermittently.

2. The method according to claim 1, wherein said introducing said flat material blank into said at least one open chain clip is performed using said feed device, and further comprising temporarily moving said material blank using said feed device in a manner that is synchronized in speed to said advancing motion of said transport chain once said material blank has been introduced into said at least one open chain clip.

3. The method according to claim 1, wherein said introducing said flat material blank into said at least one open chain clip occurs at a higher speed than a speed of said transport chain.

4. The method according to claim 1, wherein said introducing said flat material blank into said at least one open chain clip comprises one of a push-in or a placing process.

5. The method according to claim 1, wherein a plurality of material blanks are supplied to said transport chain in a successive manner at a well-defined distance from each other.

6. The method according to claim 1, further comprising detecting position of said material blank prior to said introduction of said material blank into said at least one open chain clip using one or more sensors.

7. The method according to claim 1, further comprising aligning said material blank using one of a guide element or a pusher during said introduction of said material blank into said at least one open chain clip and/or during motion synchronous to said transport chain.

8. A packaging machine with several work stations, a transport chain for transporting a flat material blank to said workstations and a chain deflection pulley on which said transport chain is mounted, wherein said transport chain comprises:
    a plurality of chain clips, each of said plurality of chain clips having an upper part and a lower part, wherein at least one of said upper part or said lower part is one of pivotable or slidable so as to allow each of said plurality of chain clips to be moveable between an open position and a closed position;
    wherein said material blank can be introduced into at least one of said plurality of chain clips disposed in said open position and secured in said at least one of said plurality of chain clips when disposed in said closed position, so that said material blank can be moved by way of said transport chain along a direction of transport;
    said chain deflection pulley further comprises a run-on contour capable to move said at least one of said plurality of chain clips into said open position, wherein said run-on contour is disposed along a section of a movement path of said chain;
    wherein said packaging machine further comprises a feed device capable to introduce said material blank into said at least one open chain clip, and a control unit capable to control and synchronize said transport chain and said feed device such that said material blank enters said at least one open chain clip while said transport chain performs an advancing motion.

9. The packaging machine according to claim 8, wherein said control unit is capable to cause an intermittent advancing motion of said transport chain.

10. The packaging machine according to claim 8, wherein said control unit is capable to control said feed device such that said material blank is temporarily moved using said feed device in a manner synchronized in speed to said advancing motion of said transport chain after introduction of said material blank into said at least one open chain clip.

11. The packaging machine according to claim 8, wherein said run-on contour is disposed in at least one of a position such that each of said plurality of chain clips is moved into said open position along a section in a region of an upper half of said chain deflection pulley, or in a manner such that position of said run-on contour is adjustable in order to adjust said position along said chain deflection pulley at which each of said plurality of chain clips is opened.

12. The packaging machine according to claim 8, wherein said feed device comprises an advancing device capable to push a material blank into said at least one open chain clip.

13. The packaging machine according to claim 8, further comprising one or more sensors disposed to detect position and orientation of said material blank.

14. A method for operating a packaging machine, the method comprising:
- advancing a transport chain along a chain deflection pulley in an advancing motion, where a plurality of chain clips are disposed on said transport chain and moved during the advancing motion of said transport chain;
- opening at least one of said chain clips by advancing said at least one of said chain clips along a run-on contour;
- introducing a flat material blank into said at least one open chain clip using one of a feed device or a connection to a second material blank preceding said flat material blank to entrain said flat material blank, wherein said material blank enters said at least one open chain clip during an advancing motion of said transport chain;
- closing said at least one of said chain clips as it leaves said run-on contour to secure said material blank in said at least one of said chain clips; and
- transporting said material blank to a work station using said transport chain;
- wherein said introducing said flat material blank into said at least one open chain clip occurs at a higher speed than a speed of said transport chain.

15. The method according to claim 14, wherein said introducing said flat material blank into said at least one open chain clip is performed using said feed device, and wherein the method further comprises temporarily moving said material blank using said feed device in a manner that is synchronized in speed to said advancing motion of said transport chain once said material blank has been introduced into said at least one open chain clip.

16. The method according to claim 14, wherein said introducing said flat material blank into said at least one open chain clip comprises one of a push-in or a placing process.

17. The method according to claim 14, wherein a plurality of material blanks are supplied to said transport chain in a successive manner at a well-defined distance from each other.

18. The method according to claim 14, further comprising detecting position of said material blank prior to said introduction of said material blank into said at least one open chain clip using one or more sensors.

19. The method according to claim 14, further comprising aligning said material blank using one of a guide element or a pusher during said introduction of said material blank into said at least one open chain clip and/or during motion synchronous to said transport chain.

* * * * *